United States Patent

Birnbaum et al.

[11] Patent Number: 5,832,008
[45] Date of Patent: Nov. 3, 1998

[54] EYESAFE LASER SYSTEM USING TRANSITION METAL-DOPED GROUP II-VI SEMICONDUCTOR AS A PASSIVE SATURABLE ABSORBER Q-SWITCH

[75] Inventors: Milton Birnbaum, Rancho Palo Verdes; Robert D. Stultz, Bellflower, both of Calif.; Marly B. Camargo, Sao Paulo, Brazil

[73] Assignee: Hughes Electronics, El Segundo, Calif.

[21] Appl. No.: 790,350

[22] Filed: Jan. 24, 1997

[51] Int. Cl.$^6$ .................................................. H01S 3/113
[52] U.S. Cl. .................................................................. 372/11
[58] Field of Search .................................. 372/11, 25, 40

[56] References Cited

U.S. PATENT DOCUMENTS

| | | | |
|---|---|---|---|
| 4,723,248 | 2/1988 | Harter et al. | 372/11 |
| 5,388,114 | 2/1995 | Zarrabi et al. | 372/11 |
| 5,394,413 | 2/1995 | Zayhowski | 372/11 |

*Primary Examiner*—Rodney B. Bovernick
*Assistant Examiner*—Robert E. Wise
*Attorney, Agent, or Firm*—Leonard A. Alkov; William C. Schubert; Glenn H. Lenzen, Jr.

[57] ABSTRACT

An eyesafe laser system includes a Q-switch crystal formed of a semiconductor host material having noncentrosymmetric tetrahedral substitutional sites doped with transition metal ions in concentrations from about 0.001 to about 0.10 atomic percent, which functions as to be a saturable absorber of light at eyesafe wavelengths with a relatively long relaxation lifetime. $Co^{2+}$:ZnSe has been demonstrated to have advantageously high absorption cross section and advantageously high relaxation lifetime at both 1.54 $\mu$m (Er:glass laser) and 1.6 $\mu$m (Er:YAG laser). Other candidate host materials include other zinc chalcogenides, cadmium chalcogenides and zinc oxide. The resultant Q-switch does not require additional focusing optics inside the cavity and has a saturation fluence which is approximately one order of magnitude less than other state of the art saturable absorbers in the "eyesafe" wavelength region, thereby permitting substantially faster Q-switch bleaching, lower thermal loads, and less potential for damage than was hitherto possible.

9 Claims, 4 Drawing Sheets

5,832,008

EYESAFE LASER SYSTEM USING TRANSITION METAL-DOPED GROUP II-VI SEMICONDUCTOR AS A PASSIVE SATURABLE ABSORBER Q-SWITCH

BACKGROUND OF THE INVENTION

This invention relates to lasers, and, more particularly, to a Q-switched laser system having a passive saturable absorber.

A laser is a device that emits a spatially coherent beam of light of a specific wavelength. In a laser, a lasing element within a laser resonator cavity is pumped with an energy source such as a flash lamp. The pumping action produces stored energy and gain within the lasing element. If the gain exceeds the losses so that there is a net light amplification per round trip of the light in the resonator cavity, laser light begins to build up in the cavity, and the stored energy can be released in the form of a very short, intense light pulse by using a device called a Q-switch.

A saturable absorber can be used as a passive Q-switch. The saturable absorber is a crystal having transmittance properties that vary as a function of the intensity of the incident light that impinges on upon the crystal. When light of low intensity is incident upon the saturable absorber, its light transmittance is relatively low, resulting in high cavity losses. As the incident light energy increases due to the buildup of energy within the laser resonator cavity, the light transmittance of the crystal increases. At some point, the light transmittance increases to a level such that the crystal "bleaches", i.e., becomes transparent, so that the cavity losses become low, and an intense Q-switched light pulse is emitted.

The properties of a saturable absorber crystal depend upon the wavelength of the incident light. A crystal which performs as a saturable absorber at one wavelength typically will not perform in the same manner at significantly different wavelengths. Further, a crystal may act as a saturable absorber for relatively low incident Intensities, but once bleaching is achieved, the resultant higher intensities may damage the crystal. A significant limitation on the performance of many known saturable absorber Q-switch materials is their susceptibility to damage from an intense light beam. The high intensity light pulse passing through the crystal causes permanent damage, so that the ability of the crystal to function as a saturable absorber for subsequent cycles is impaired. There is therefore an ongoing search for effective saturable absorber crystals for use as Q-switches in particular wavelength ranges which are robust (i.e., have high damage thresholds).

One of the laser operating ranges of interest is at the "eyesafe" range from about 1.5 micrometers to about 1.8 micrometers. This wavelength range is of particular interest because light in this range will not damage the human eye at moderate intensities. For example, the Er:glass laser emits infra-red light at about 1.53 µm wavelength, and is of interest as an eye-safe laser. (In this accepted notation, A:B indicates a material having an ion of A doped into a B host crystal.) Another example is the Er:YAG laser, which emits infra-red light at about 1.64 µm. $Co^{2+}$, in materials such as $M_gF_2$ and $Kz_nF_3$, has been used as a tunable laser source from 1.5 µm to 2.3 µm and possesses a broad absorption band in the eyesafe band. $Co^{2+}$-doped garnets have been demonstrated to function as saturable absorber Q-switches for the Er:glass laser. However, the known $Co^{2+}$-doped garnet Q-switches have high saturation intensities and require an intra cavity focusing lens, and also have an excited-state lifetime which is very short (less than 1 ns for $Co^{2+}$). For a fast relaxing Q-switch, one must consider the saturation intensity, which is proportional to $(OT)^{-1}$ where OT is the absorption cross-section, and T is the lifetime of the relaxation. Therefore, even materials which possess relatively high absorption cross-section values can have undesirably high saturation intensities (and increased potential for damage) due to a short lifetime (The saturation intensities for $Co^{2+}$ in garnets is on the order of 100 $MW/cm^2$).

Known saturable absorbers suitable for use with the eyesafe wavelengths produced by Er:glass and/or Er:YAG lasers include $Er^{3+}:Ca_5(PO_4)_3F$, $U^{4+}:SrF_2$, $U^{4+}:SrF_2$, $U^{4+}:CaF_2$, and $Er^{3+}:CaF_2$. However, these particular absorbers have relatively long relaxation lifetimes, but lower absorption cross sections, relative to $Co^{2+}$: ZnSe.

Zinc selenide (ZnSe) and the other zinc chalcogenides are members of a compositional class of II–VI semiconductor crystals which also includes the cadmium chalcogenides and zinc oxide. These particular semiconductors have similar crystalline properties (noncentrosymmetric tetrahedral substitutional sites) and are known to provide a comparatively favorable environment for IR emission from transition metal (TM) ions. However, when doped with $Co^{2+}$ or other similar TM ions (such as $Cr^{2+}$, $Fe^{2+}$, or $Ni^{2+}$), none of the II–VI semiconductor crystals have been demonstrated to have utility as a robust saturable absorber for reliably producing short, high intensity pulses from eyesafe lasers.

SUMMARY OF THE INVENTION

The present invention provides a laser system having a passive Q-switch. The laser system can produce relatively high-intensity output pulses of very short duration and high repetition rate. The Q-switch material is operable over a range of eyesafe wavelengths at about 1.5 µm, and is therefore operable with a number of types of lasing elements.

In accordance with the invention, a laser system comprises a laser resonator cavity having a resonant axis and a lasing element within the laser resonator cavity. The lasing element, under stimulation by a flash lamp or other suitable optical pumping means, emits light at an eyesafe wavelength greater than about 1.35 µm, and less than about 1.9 µm, The Q-switch crystal of the present invention comprises a crystaline II–VI semiconductor material doped with transition metal ions and functions as a passive saturable absorber for the eyesafe wavelength light emitted by the lasing element.

In a presently preferred embodiment, the crystalline II–VI semiconductor material is zinc selenide and the transition metal ions are $Co^{2+}$ ions, which has been demonstrated to provide a passive saturable absorber at both 1.53 µm and 1.64 µm which has an advantageously high absorption cross section and an advantageously long relaxation lifetime. The resultant Q-switch does not require additional focusing optics inside the cavity and has a saturation fluence which is approximately one order of magnitude less than other state of the art saturable absorbers, thereby permitting substantially faster operation, lower thermal loads, and less potential for damage than was hitherto possible.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
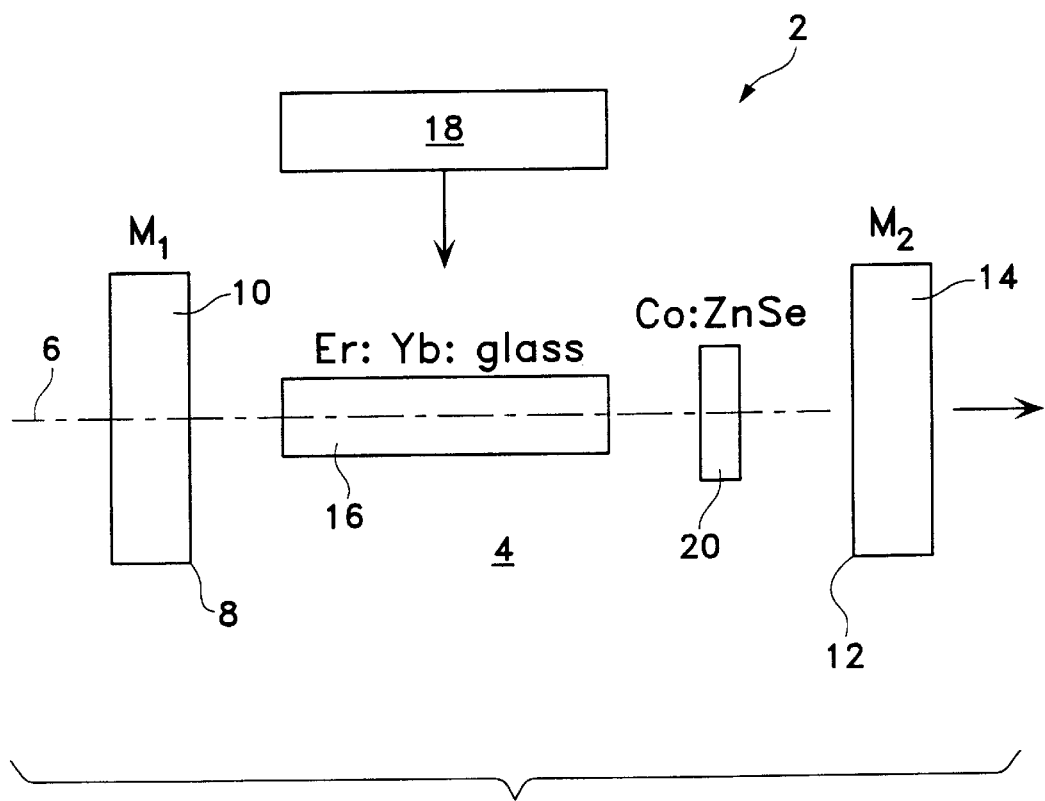
FIG. 1 is a schematic drawing of a laser system according to the invention.

FIG. 1 schematically illustrates an experimental setup for a laser system 2 according to the present invention. The laser system 2 includes a laser resonator cavity 4 having a resonant axis 6. At a first end 8 of the cavity 4 is a reflector 10, which has a reflectivity of substantially 100 percent at the operating wavelength, and a 50 cm concave radius of curvature. At a second end 12 of the cavity 4 is an outcoupler 14, having a reflectivity that is less than 100 percent at the operating wavelength.

A lasing element 16 is positioned within the laser resonator cavity 4. The lasing element 16 is in the form of a cylindrical solid rod (3×50 mm) of Kigre Er:Yb:phosphate glass (QE-7S), whose cylindrical axis coincides with the resonant axis 6. When stimulated, the lasing element 16 emits coherent light having an operating wavelength in the eyesafe range, and more specifically a wavelength greater than about 1.35 $\mu$m and less than about 1.9 $\mu$m. Examples of materials believed to be appropriate for a lasing element 16 operable at eyesafe wavelengths include not only Er:glass (erbium doped into a phosphate glass host, but also $Tm^{3+}$:YLF (thulium doped into a yttrium-lithium fluoride host), and $Er^{3+}$:YAG (erbium doped into a yttrium-aluminum garnet host). These lasing elements are all known in the art. A conventional means for optically pumping the lasing element is provided, for example a linear flash lamp 18 positioned adjacent to the lasing element 16.

A Q-switch crystal 20 is positioned within the laser resonator cavity 4 with the resonant axis 6 passing therethrough. The Q-switch crystal 20 is shown as lying between the lasing element 16 and outcoupler 14; however, the system 2 would also be operable if Q-switch crystal were located at the other end of cavity 4 adjacent reflector 10. The Q-switch crystal 20 is a saturable absorber of light in the wavelength range at about 1.5 micrometers, and more specifically from about 1.35 to about 1.9 micrometers.

The Q-switch crystal 20 is formed of a host semiconductor material with a sufficient concentration of transition metal ions (e.g., ions therein to act as a saturable absorber in the eyesafe wavelength range. The Q-switch material desirably has a higher absorption cross section, preferably a much higher absorption cross section, than the stimulated emission cross section of the lasing element 16, so that no separate focusing elements are required inside cavity 4.

Although zinc selenide is presently preferred as the host semiconductor material, other zinc chalcogenides, cadmium chalcogenides and zinc oxide, which have similar crystaline properties (noncentrosymmetric tetrahedral substitutional sites), when doped with a suitable transition metal ion which provides a relatively long relaxation lifetime (such as $Co^{2+}$) in concentrations from about 0.001 to about 0.10 atomic percent, are believed to also have potential utility as saturable absorbers in the eyesafe range.

A laser system 2 similar to that illustrated in FIG. 1 was built and operated to demonstrate the performance of the Q-switched laser system. The laser resonator cavity 4 was about 19 centimeters long. The outcoupler mirror 14 was flat and had a 95% percent reflectance. The other mirror 10 was curved and had a 50 centimeter radius of curvature and a reflectance of 95 percent at a wavelength of about 1.53 micrometers.

The lasing element 16 used for the demonstration was a Kigre QE-7S Er:Yb:phosphate glass rod, having a diameter of 3 millimeters and a length of 50 millimeters; however, other lasing elements functioning in the eyesafe range could be substituted.

Figure 2:
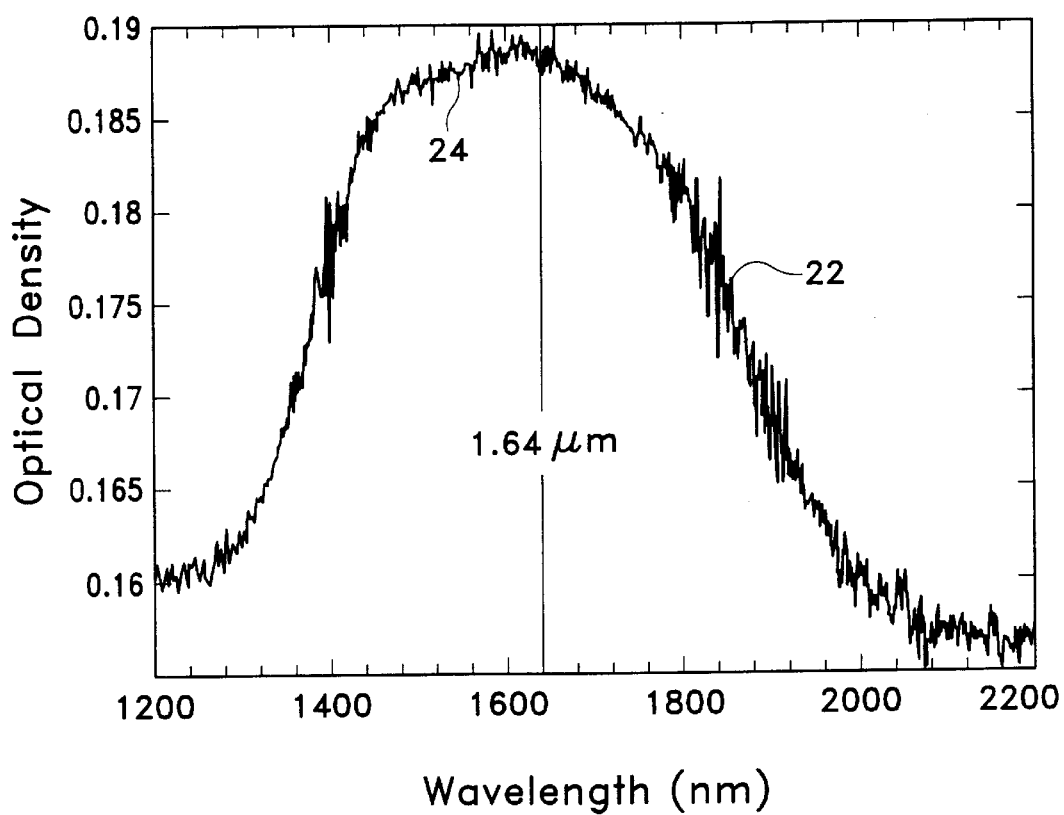
FIG. 2 is graph illustrating the absorption spectra of a Co:ZnSe saturable absorber at low light intensities (no bleaching).

The Q-switch 20 was fabricated from a relatively lightly doped (nominal 0.001 atomic percent) $Co^{2+}$:ZnSe boule fragment obtained from the EaglePicher Co, which has a $Co^{2+}$ absorption band 22 (transmittance at small signals before any bleaching has occurred) with a peak 24 at around 1.54 $\mu$m (FIG. 2). A thickness of 1.5 mm provided an internal loss of about 6% and the $Co^{2+}$ ions had a calculated ion concentration of about $9 \times 10^{17}$ $cm^{-3}$; however the invention is believed to be operable with a wide range of transistion metal ion concentrations up to at least about 0.10 nominal atomic percent.

Figure 3:
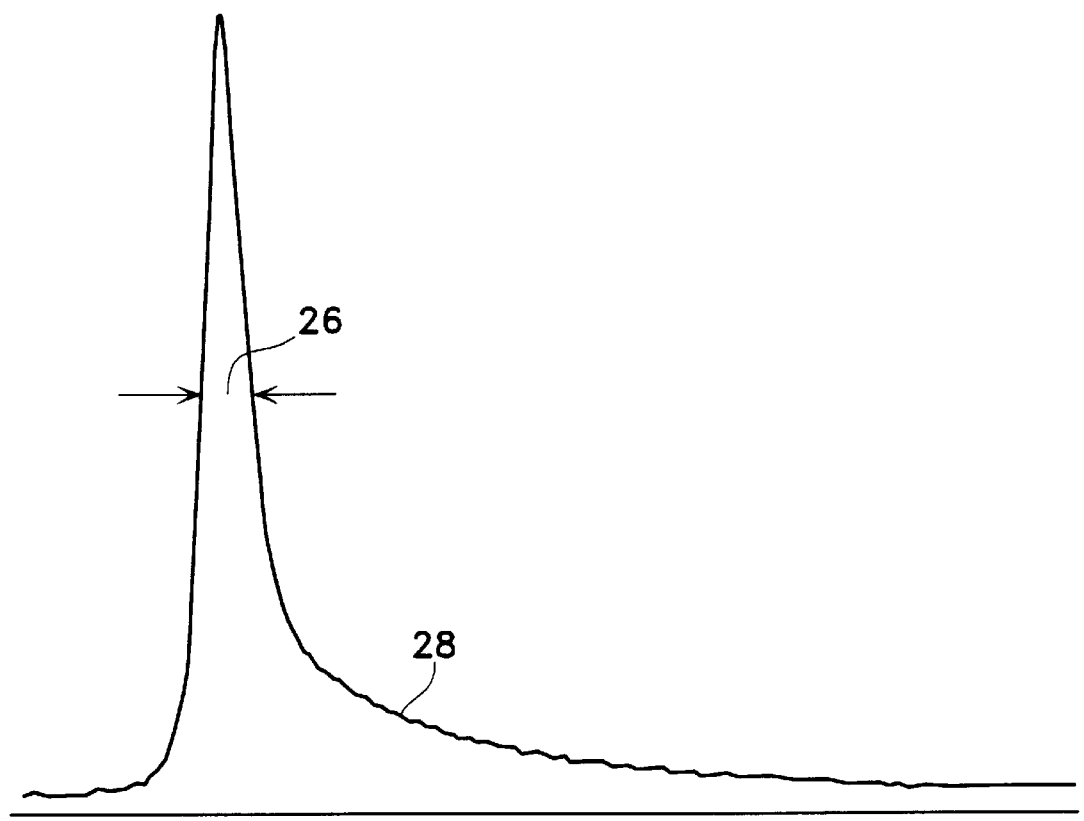
FIG. 3 is an oscilloscope trace of a light pulse output as a function of time for the laser system of FIG. 1, using a Co:ZnSe Q-switch.

A typical output pulse from the experimental setup is shown in the oscilloscope trace of FIG. 3. The full-width-half-maximum 26 for the pulse is about 100 ns. The tail 28 in the pulse is an artifact of the Judson InGeAs photodiode used in the experiment. In a shorter laser resonator (14.5 cm long) with a flat outcoupler of R=85%, pulses of about 2.6 mJ and 77 ns were observed.

Figure 4:
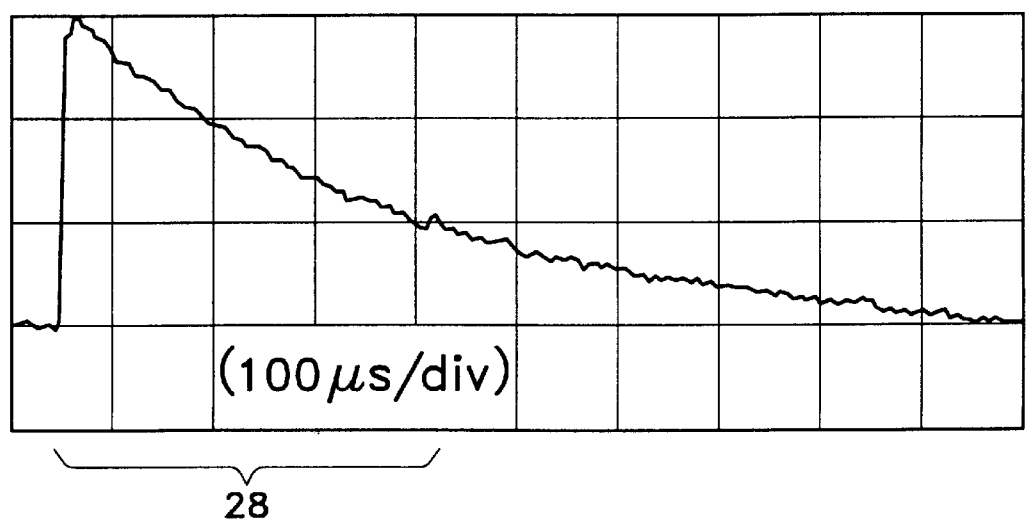
FIG. 4 is an oscilloscope trace showing the relaxation lifetime of a Co:ZnSe saturable absorber when pumped with a 1.5 $\mu$m source.

FIG. 4 is an oscilloscope trace showing an observed relaxation lifetime 30 (time to decay by a factor of 1/e) of about 350 $\mu$s for the $Co^{2+}$:ZnSe saturable absorber 20 when pumped with a 1.5 $\mu$m source.

Figure 5:
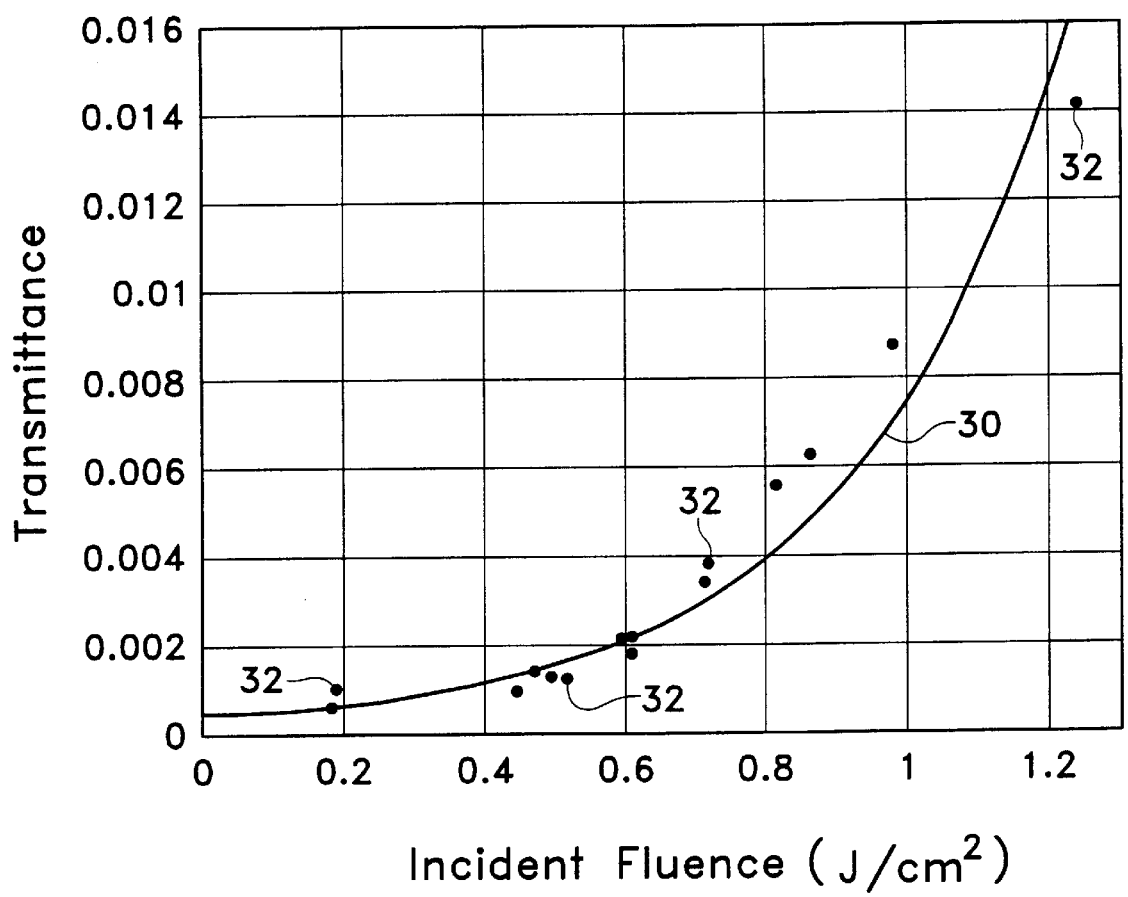
FIG. 5 is a graph showing the transmittance of Co:ZnSe as a function of incident fluence at 1.5 $\mu$m.

FIG. 5 is a graph showing the change in transmittance 32 of the Co:ZnSe saturable absorber 20 as a function of incident fluence at 1.5 $\mu$m. The experimental data 34 corresponds to a calculated fluence at saturation of 0.21 $J/cm^2$, which is an order of magnitude less than the corresponding saturation fluence for what was heretofor considered a state of the art saturable absorber for eyesafe wavelengths (U:$CaF_2$, 1.9 $J/cm^2$).

In another experiment employing (0.001%)$Co^{2+}$:ZnSe as the saturable absorber 20, an Er:YAG laser (15%Yb:0.3%Er:YAG, 0.6 cm×7.6 cm) was pumped longitudinally with a Er:Yb:phosphate glass laser at 1.53 $\mu$m. The output beam from the pumping laser 18 was focused on the middle of the Er:YAG laser. The laser resonator cavity was formed by pair of mirrors 10, 14 with reflectivities of about 100% and 97% at the output wavelength (1.64 $\mu$m) of the Er:YAG laser, and essentially 100% transmissive at the output wavelength (1.53 $\mu$m) of the pumping laser. The saturable absorber 20 was 1.525 mm thick and produced pulses of about 250 ns and 1.1 mJ, as shown in FIG. 4. The calculated absorption cross section at saturation was $6.2 \times 10^{-19}$ $cm^2$, which is one order of magnitude higher than known state of the art eyesafe saturable absorber materials such as U:$CaF_2$.

Thus, $Co^{2+}$-doped zinc selenide and other transition element-doped semiconductor crystals having similar absorption and emission properties should be suitable for use used with a variety of lasing elements 16 in the eyesafe range such as Er:glass (1.53 micrometers wavelength), $Tm^{3+}$:YLF (1.45 micrometers wavelength), and $Er^{3+}$:YAG (1.64 micrometers wavelength), as well as other lasing elements that produce light in this wavelength range. Examples of other suitable laser media can be found in Marvin J. Weber, ed., "CRC Handbook of Laser Science and Technology", CRC Press, pages 200–207 (1991), and in DeLoach et al, "Transition Metal-Doped Zinc Chalcogenides: Spectroscopy and Laser Demonstration of a New Class of Gain Media", *IEEE Journal of Quantum Electronics*, vol 32 no 6, pages 885–895 (June 1996), which are hereby incorporated by reference.

The present invention thus provides a laser system 2 with a passive Q-switch 20 having a high damage threshold, operating in the eyesafe range of about 1.4 to about 2.0 μm and not requiring any intracavity focusing elements. Although a particular embodiment of the invention has been described in detail for purposes of illustration, various modifications and enhancements may be made without departing from the spirit and scope of the invention. For example, it is expected that use of anti-reflective coatings on the surfaces of crystal 20, as well as an increase in the saturable losses (thicker Q-switch crystal) will significantly shorten the pulsewidth and increase the output energy. Accordingly, the invention is not to be limited except as by the appended claims.

What is claimed is:

1. A laser system, comprising:

a laser resonator cavity having a resonant axis;

a lasing element within the laser resonator cavity, the lasing element emitting, under stimulation, IR radiation at an eyesafe wavelength of from about 1.5 μm to about 1.8 μm;

means for optically pumping the lasing element; and a passive saturable absorber responsive to said IR radiation and lying along the resonant axis within the laser resonator cavity, wherein the saturable absorber is formed from a II–VI semiconductor crystal selected from the group consisting essentially of zinc selenide, other zinc chalcogenides, cadmium chalcogenides, zinc oxide, and other II–VI semiconductor crystals having crystaline properties similar to zinc selenide, and said semiconductor crystal is doped with transition metal ions selected from the group consisting essentially of $Cr^{2+}$, $Fe^{2+}$, $Ni^{2+}$, and $Co^{2+}$.

2. The laser system of claim 1, wherein the laser resonator cavity comprises a reflector at a first end thereof having a reflectivity of substantially 100 percent; and an outcoupler at a second end thereof having a reflectivity of less than 100 percent, and the saturable absorber is positioned between the reflector and the outcoupler.

3. The laser system of claim 1, wherein the lasing element comprises a glass host material.

4. The laser system of claim 3, wherein the glass host material is doped with erbium ions.

5. The laser system of claim 1, wherein the lasing element comprises a garnet host material.

6. The laser system of claim 5, wherein the garnet host material is doped with erbium ions.

7. The laser system of any one of the preceding claims, wherein the transition metal ions are $Co^{2+}$ ions.

8. The laser system of claim 7, wherein the semiconductor crystal is zinc selenide.

9. A saturable absorber for use with eyesafe wavelengths from about 1.5 μm to about 1.8 μm, said absorber comprising a II–VI semiconductor doped with transition metal ions and characterized by a saturation fluence of no more than about 0.21 J/cm$^2$, a relaxation lifetime of at least about 350 μsec, and an absorption cross section of at least about $6 \times 10^{-19}$ cm$^2$.

* * * * *